G. O. HOPPE.
SEED PLANTING MACHINE.
APPLICATION FILED AUG. 28, 1917.
1,279,545.
Patented Sept. 24, 1918.
3 SHEETS—SHEET 1.
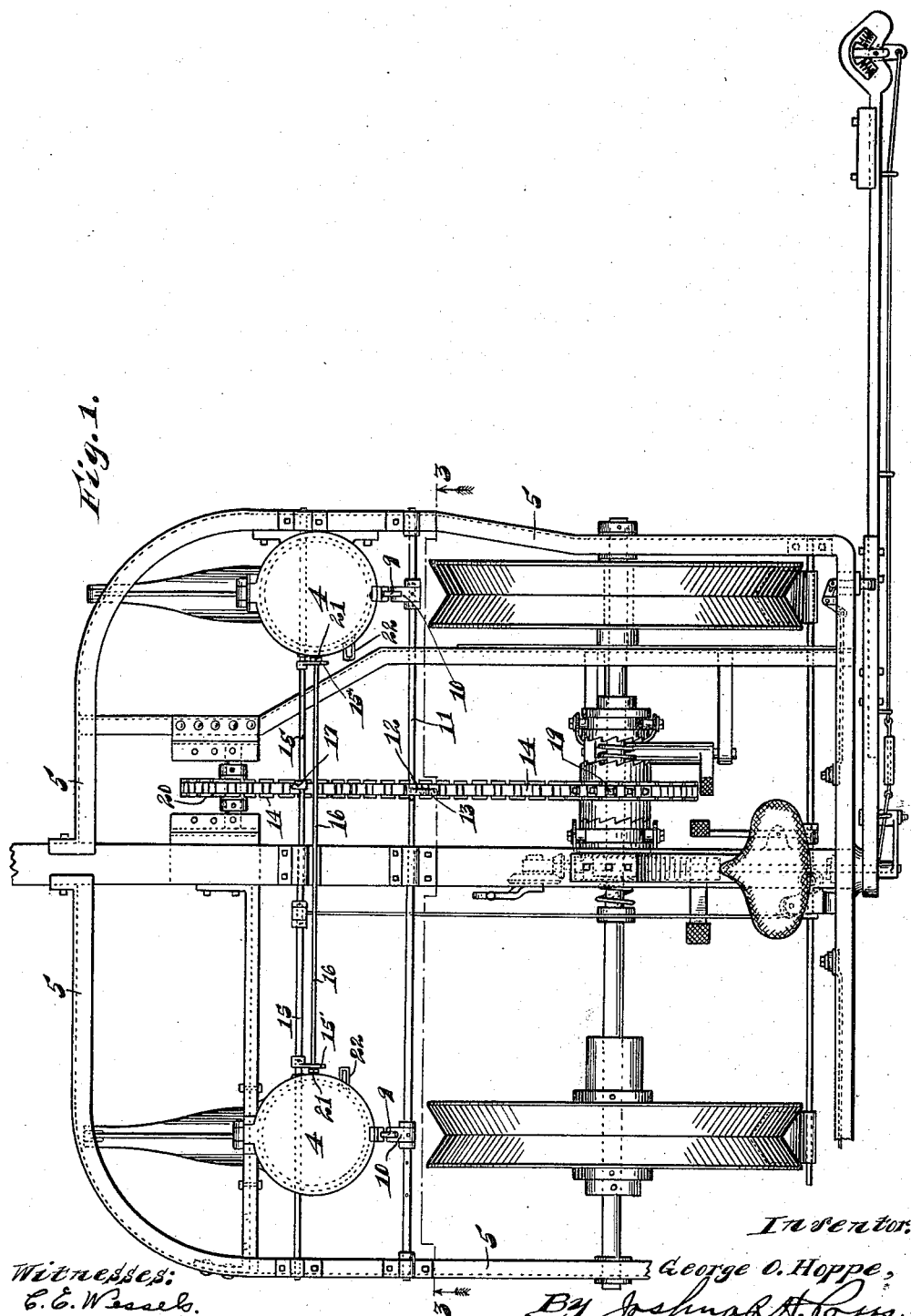

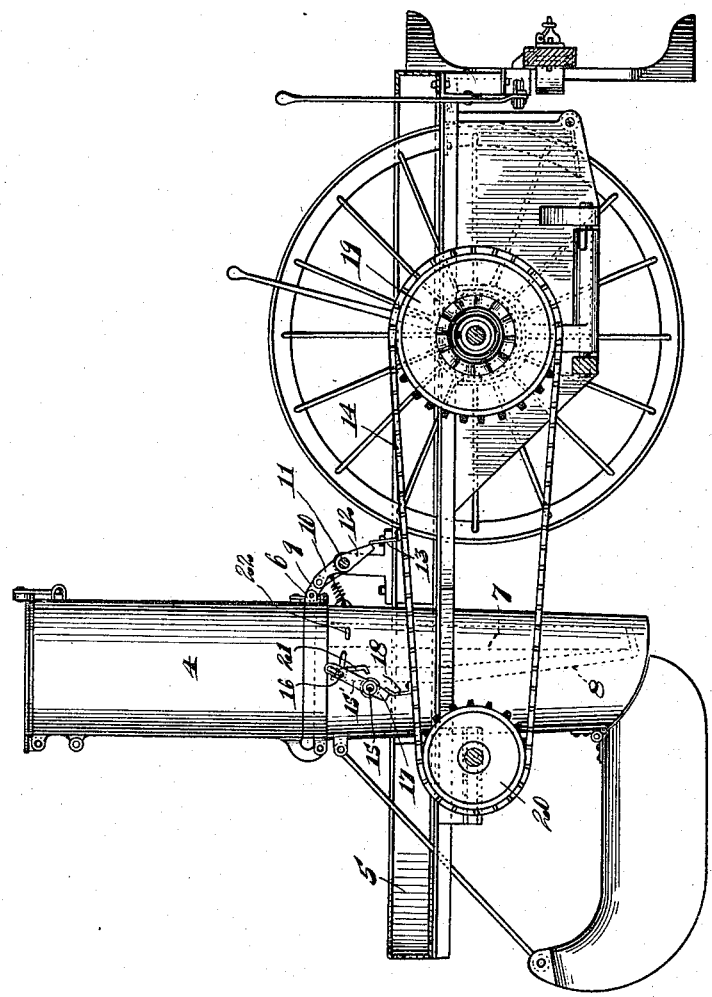

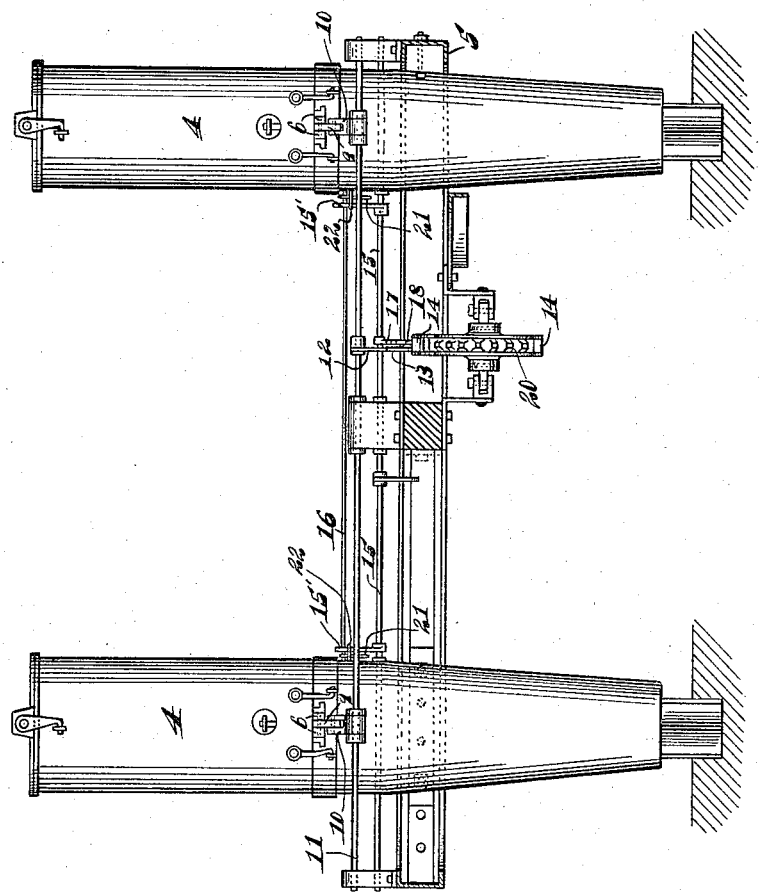

UNITED STATES PATENT OFFICE.

GEORGE O. HOPPE, OF CHARLOTTE, ILLINOIS.

SEED-PLANTING MACHINE.

1,279,545.        Specification of Letters Patent.     Patented Sept. 24, 1918.

Original application filed May 10, 1917, Serial No. 167,824. Divided and this application filed August 28, 1917. Serial No. 188,575.

*To all whom it may concern:*

Be it known that I, GEORGE O. HOPPE, a citizen of the United States, and a resident of the town of Charlotte, county of Livingston, and State of Illinois, have invented certain new and useful Improvements in Seed-Planting Machines, of which the following is a specification.

My invention relates to improvements in seed planting machines, especially designed for use in planting corn, and has for its object the production of a device of this character, which will be of durable and economical construction and efficient in use, the present application being a division of my prior application filed May 10, 1917, Serial No. 167,824.

The invention consists in the combinations and arrangements of parts hereinafter described and claimed.

The invention will be best understood by reference to the accompanying drawings forming a part of this specification, and in which, Figure 1 is a top plan view of a planter embodying the invention, Fig. 2, a medial longitudinal section of the same, and Fig. 3, a section taken on line 3—3 of Fig. 1.

The preferred form of construction as illustrated in the drawings comprises two seed hoppers or containers 4 mounted upon a suitable wheel frame 5. Each of these hoppers is provided with a shiftable perforated plate 6, arranged to convey seeds or grains from the corresponding hopper and discharge the same into a discharge pipe or passage 7, the lower end of which is normally closed by an oscillatory closure 8. Each of the plates 6 is connected by a link 9 with a rocker arm 10 on an oscillatory shaft 11 mounted on the frame of the machine and carrying a rocker arm 12 set in the path of a tappet or finger 13 on a sprocket chain 14. The closures 8 are operated by means of arms 15' on a rocker shaft 15 carrying a rod 16 operatively connected with the upper ends of closure 8, the shaft 15 being provided with a rocker arm 17 set in the path of a tappet or finger 18 on chain 14. The chain 14 is driven by sprockets 19 and 20 from the axle of the frame 5 and hooks 21 are provided on rod 16 to engage eyes or loops 22 for preventing operation of closures 8 when desired.

By this arrangement it will be observed that upon operation of the chain 14 the plates 6 will be periodically operated to transfer seeds from the hoppers 4 to the discharge pipes 7 and that these transferred seeds will be discharged from the machine periodically by the action of the tappet 18 on the rocker arm 17. By varying the length of chain 14, or by placing more or less of the tappets 13 and 18 thereon, the periods at which the seeds will be discharged may be varied as desired.

While I have illustrated and described the preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

In a seed planter, the combination of a frame; bearing wheels supporting said frame; seed depositing mechanism carried by said frame comprising a hopper; a seed discharge passage; means for intermittently conveying seeds from said hopper to said passage; a movable closure coöperating with said passage; and operative connection between said bearing wheels and said conveying means and closure comprising an endless chain: oscillatory shafts adapted, when oscillated, to effect actuation of said conveying means and closure; rocker arms on said shafts; projections on said chain adapted to engage with and rock said shafts; and means for locking one of said rocker arms in inoperative position to prevent actuation of said closure upon movement of said chain, substantially as described.

In testimony whereof I have signed my name to this specification in the presence of two subscribing witnesses.

GEORGE O. HOPPE.

Witnesses:
    H. W. DASSON,
    FRANK H. HERR.

Copies of this patent may be obtained for five cents each, by addressing the "Commissioner of Patents, Washington, D. C."